(12) United States Patent
Czajkowski et al.

(10) Patent No.: US 8,200,938 B2
(45) Date of Patent: Jun. 12, 2012

(54) COMPUTER SYSTEM AND METHOD PROVIDING A MEMORY BUFFER FOR USE WITH NATIVE AND PLATFORM-INDEPENDENT SOFTWARE CODE

(75) Inventors: Grzegorz Jan Czajkowski, Menlo Park, CA (US); Laurent Philippe Daynes, Saint-Ismier (FR)

(73) Assignee: Oracle America, Inc., Redwood City, CA (US)

( * ) Notice: Subject to any disclaimer, the term of this patent is extended or adjusted under 35 U.S.C. 154(b) by 1466 days.

(21) Appl. No.: 11/728,091

(22) Filed: Mar. 22, 2007

(65) Prior Publication Data

US 2007/0288682 A1    Dec. 13, 2007

Related U.S. Application Data

(63) Continuation of application No. 10/073,851, filed on Feb. 11, 2002, now Pat. No. 7,213,098.

(51) Int. Cl.
*G06F 12/08* (2006.01)
(52) U.S. Cl. .............. 711/203; 711/6; 711/147; 719/312
(58) Field of Classification Search .............. 711/6, 147, 711/153, 170, 203; 719/312
See application file for complete search history.

(56) References Cited

U.S. PATENT DOCUMENTS 6,349,355 B1 *   2/2002   Draves et al. .................... 711/6

* cited by examiner

*Primary Examiner* — Jasmine Song
(74) *Attorney, Agent, or Firm* — Osha • Liang LLP

(57) ABSTRACT

The present invention relates to native and platform-independent software code. In a particular embodiment, the method includes providing a first software program compiled to platform-independent code for execution in a first process of the computer system, providing a second software program compiled to native code for execution in a second process of the computer system, and sending a message from the first process to the second process to request a memory buffer.

12 Claims, 7 Drawing Sheets

COMPUTER SYSTEM AND METHOD PROVIDING A MEMORY BUFFER FOR USE WITH NATIVE AND PLATFORM-INDEPENDENT SOFTWARE CODE

CROSS-REFERENCE TO RELATED APPLICATION(S)

The present application claims priority under 35 U.S.C. §120 from and is a continuation of U.S. patent application Ser. No. 10/073,851 filed Feb. 11, 2002, entitled "COMPUTER SYSTEM AND METHOD PROVIDING A MEMORY BUFFER FOR USE WITH NATIVE AND PLATFORM-INDEPENDENT SOFTWARE CODE," with the same inventors and the same assignee.

BACKGROUND

1. Field of the Invention

The present invention relates to a computer system and method providing a memory buffer for use with native and platform-independent software code.

2. Description of the Related Art

A common trend among computer specialists is to use safe computer-programming languages and systems to implement computer programs. Typically, programs written in these safe computer-programming languages are compiled to a platform-independent code for execution within safe virtual machines on a variety of target computers. In this context, the term "safe" indicates a level of confidence that the program and runtime system will not interfere with other applications running on the target computer and will not adversely affect memory use.

The growing popularity of these safe computer-programming languages has not, however, obviated the need for using native code on the target computers. Native code is code that has been compiled into the native instruction set of a particular computer processor, and additionally in the context of this document refers to code originally developed in an unsafe language (such as C, C++, or low-level assembler languages). While safe languages offer many benefits, including inherent code reliability, increased programmer productivity, and ease of code maintenance, it is quite often desirable to execute user-supplied native code. There are several reasons for accepting this impurity, such as higher performance, access to devices and programming interfaces for which there is no standard mapping from the platform-independent runtime system, and direct interaction with operating system services. Nevertheless, native code is often unsafe and, as such, may be less reliable than using the safe language.

As an example of how native code may be accessed by safe code running in a safe environment, FIG. 1 illustrates platform-independent runtime environment 104 accessing native code library 106. Platform-independent runtime environment 104 is contained within process 102 and is typically executing a platform-independent program. Process 102 also includes native code library 106 and platform-independent native interface (PINI) 108. Platform-independent runtime environment 104 and any executing platform-independent programs access native code library 106 through PINI 108. The interaction through PINI 108 can have two forms: downcall 110 (when a platform-independent program calls a native sub-routine) and upcall 112 (when a native sub-routine needs to access data or invoke sub-routines of the platform-independent program). In this example, PINI 108 is the only access point to native code library 106 from platform-independent runtime environment 104. In operation, a platform-independent program running in platform-independent runtime environment 104 can make downcall 110 to a sub-routine within native code library 106. In turn, native code library 106 can make an upcall 112 to platform-independent runtime environment 104 to access data and platform-independent sub-routines.

The goal of providing native code that does not violate certain safety policies while it is executing in the same address space as the platform-independent code has been the focus of several research projects. Descriptions of relevant research projects can be found in the following references: *Efficient Software Fault Isolation* (Wahbe, R., Lucco, S., Anderson, T., and Graham, S., $14^{th}$ ACM Symposium on Operating Systems Principles, Asheville, N.C. December 1993) describing augmenting native code with safety-enforcing software checks; *Safe Kernel Extensions without Runtime Checking* (Necula, G., and Lee, P., Proceedings of the Second Symposium on Operating Systems Design and Implementation, Seattle, Wash., 1996) describing statically analyzing native code and proving it to be memory safe; and *TALx86: A Realistic Typed Assembly Language* (Morrisett, G., Crary, K., Glew, N., Grossman, D., Samuels, K., Smith, F., Walker, D., Weirich, S., and Zdancewic, S., Proceedings of ACM SIGPLAN Workshop on Compiler Support for System Software, Atlanta, Ga., May 1999) describing designing a low-level, statically typed target language for compiling native code.

While the methods used in these research projects have been successful to a point and are useful in some circumstances, their usefulness for addressing problems with an arbitrary native library is rather limited. Augmenting the native code with safety-enforcing software checks can incur a substantial performance penalty, which is difficult to accept when considering that the native code is often used as a performance-boosting mechanism. Statically analyzing the native code and proving that it is safe requires the availability of the source code for the native code and the generation of formal proofs of correctness, which is difficult or otherwise not practical.

In addition to these complexities, certain newer versions of platform-independent environments, such as Java™, now allow for memory sharing between the virtual machine and the native code library. The memory sharing through direct buffers adds further complexity to systems with mixed language programs, including native code.

Accordingly, there is a need for an improved method and system that allows a safe program to use sub-routines in a native code library that may be extended for use with direct buffers.

SUMMARY

The present invention relates to computer systems and methods for providing a memory buffer for use with native and platform-independent software code.

In a particular embodiment, the method includes providing a first software program compiled to platform-independent code for execution in a first process of the computer system, providing a second software program compiled to native code for execution in a second process of the computer system, and sending a message from the first process to the second process to request a memory buffer.

In another embodiment, a method of processing a request to create a memory buffer object for use in a computer system is provided. In this embodiment, the method includes receiving a request to create a memory buffer object from a software program compiled to a computer system-independent language, generating a first memory buffer object in a first process executing the software program, and generating a second memory buffer object via a second process. The second process is executing native code.

In a particular embodiment, the computer system includes a processor and a memory. The computer system includes a first process to execute a first software program coded in a safe language, a second process to execute a second software program coded in an unsafe language, and an inter-process communication mechanism that allows data message communication between the first process and the second process. The inter-process communication mechanism includes a command that provides for transmission of a message from the first process to the second process to request creation of a direct buffer that is mapped from both the first process and the second process to a common memory area.

In another embodiment, the method includes providing a first software program compiled to platform-independent code for execution in a first process, providing a second software program compiled to native code for execution in a second process, requesting a first memory buffer in the first process, the first memory buffer having a first address range, sending a message from the first process to the second process to request a second memory buffer in the second process, and mapping the first address range to a physical memory area identified by an identifier received from the second process.

In another embodiment, a method for use with a computer system that has a first software program compiled to platform-independent code for execution in a first process and a second software program compiled to native code for execution in a second process is provided. In this embodiment, the method includes receiving a message at the second process that requests a memory buffer, allocating an address range in the second process for the memory buffer, and creating the memory buffer in the second process. The memory buffer is associated with the address range.

In another embodiment, a computer system including a processor and a memory is provided. The computer system includes a first process to execute a first software program coded in a safe language, a second process to execute a second software program coded in an unsafe language, an inter-process communication mechanism that allows data message communication between the first process and the second process, a first memory buffer object accessible by the first and the second process, and a second memory buffer object accessible by the first and the second process.

In another embodiment, a method of processing a request to create a memory buffer object for use in a computer system is provided. In this embodiment, the method includes receiving a request to create a first memory buffer object from a software program compiled to a computer system-independent language, receiving a request to create a second memory buffer object from the software program compiled to a computer system-independent language, allocating a first memory address range for the first memory buffer object in a first process executing the software program, allocating a second memory address range for the second memory buffer object in a first process executing the software program, the second memory address range at least partially overlapping the first memory address range, and allocating a memory address range for each of the first memory buffer object and the second memory buffer object, in a second process. The second process executes native code.

BRIEF DESCRIPTION OF THE DRAWINGS

The use of the same reference symbols in different drawings indicates similar or identical items.

DETAILED DESCRIPTION OF THE DRAWINGS

Figure 2:
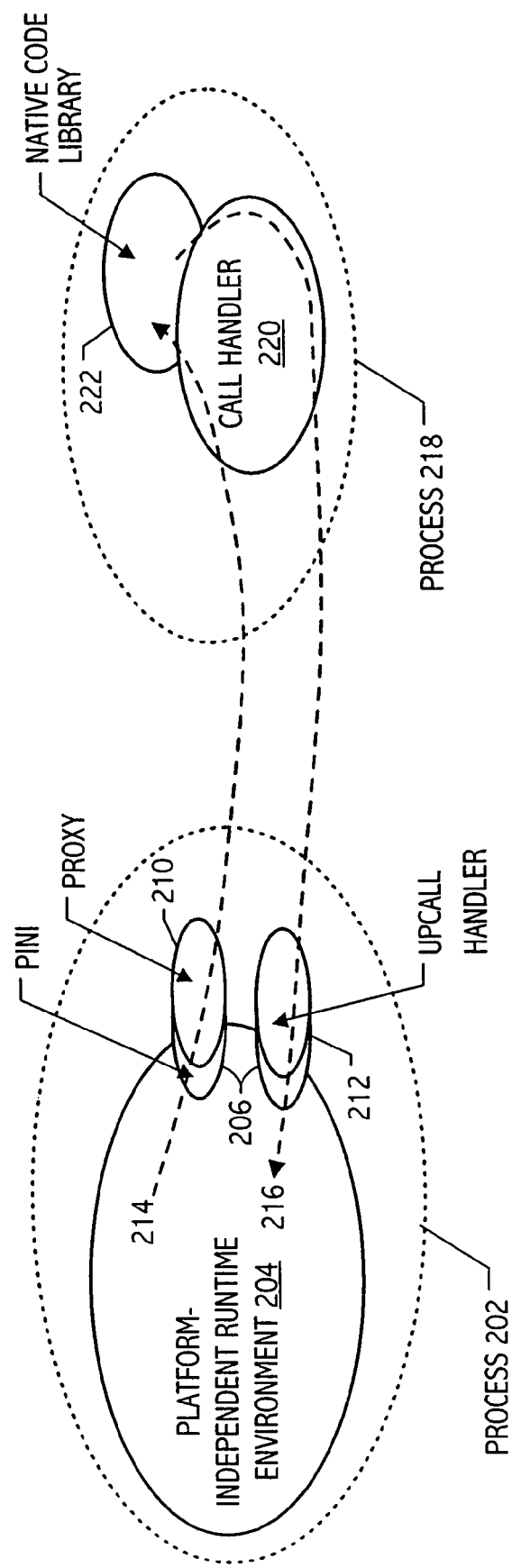
FIG. 2 illustrates interactions between platform-independent runtime environment 204 and native code library 222 in accordance with an embodiment of the present invention.

FIG. 2 illustrates platform-independent runtime environment 204 accessing native code library 222. Platform-independent runtime environment 204 is ruining within process 202, while native code library 222 is running within process 218. Process 202 and process 218 are isolated from each other by the computer operating system (not shown). Platform-independent runtime environment 204 may be executing a platform-independent program.

If platform-independent runtime environment 204 requires a service from a sub-routine in native code library 222, platform-independent runtime environment 204 generates downcall 214 and passes downcall identifier 25 and its arguments 214 to platform-independent native code interface (PINI) 206. PINI 206 passes downcall 214 to proxies 210. Proxies 210 have the same sub-routine names and parameter lists as the sub-routines within native code library 222. Proxy 210 sends the call arguments from downcall 214 plus a unique integer identifying the required sub-routine to call handler 220 in process 218. The communication between process 202 and process 218 can be any suitable interprocess call (IPC).

Call handler 220 receives the call arguments from downcall 214 plus the unique integer identifying the required sub-routine. Call handler 220 creates the proper sub-routine call to native code library 222. Return values, such as status messages and calculation results from the sub-routine within native code library 222 are passed back to platform-independent runtime environment 204 using the IPC.

If the sub-routine within native code library 222 requires upcall 216 to a sub-routine or data in platform-independent runtime environment 204, upcall 216 and its arguments are passed to call handler 220. Call handler 220 sends the call arguments from upcall 216 plus a unique integer identifying the required subroutine or data to upcall handler 212 in process 202. As with downcall 214, the communication between process 218 and process 202 for upcall 216 can be any suitable IPC. Upcall handler 212 receives the call arguments from upcall 216 plus the unique integer identifying the required sub-routine or data. Upcall handler 212 passes the upcall to platform-independent runtime environment 204 through PINI 206. Return values and data for upcall 216 are passed back to native code library 222 through the IPC mechanism. The system provides that upcall 216 will be executed by the same thread of the process that made downcall 214 to the native method.

Figure 1:
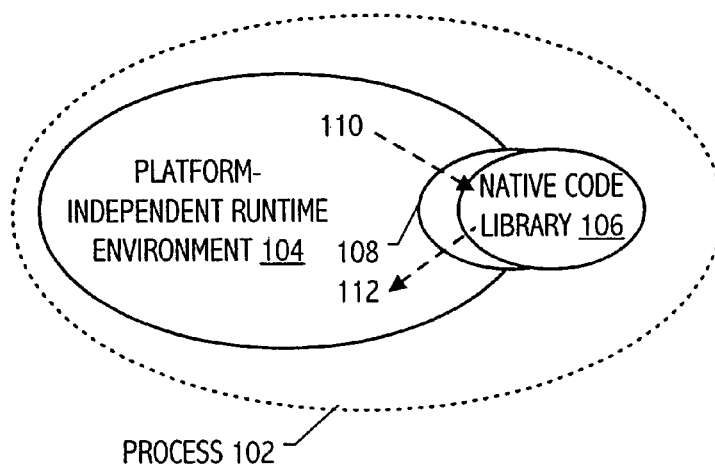
FIG. 1 illustrates interactions between platform-independent runtime environment 104 and native code library 106.
Figure 3A:
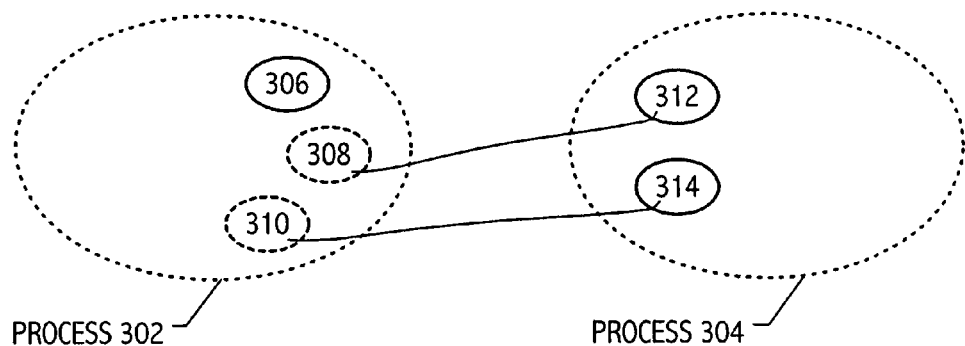
FIG. 3A illustrates multiple native code libraries placed in a separate process in accordance with an embodiment of the present invention.

FIG. 3A illustrates multiple native code libraries placed in a separate process. In this embodiment, platform-independent code running within process 302 requires the services supplied by native code libraries 306, 312, and 314. Native code library 306 can be a trusted library and has been retained within process 302. Native code libraries 312 and 314 have been placed in process 304 and are accessed by proxies 308 and 310, respectively. Details of the interfaces to native code libraries 312 and 314 are as described above.

Figure 3B:
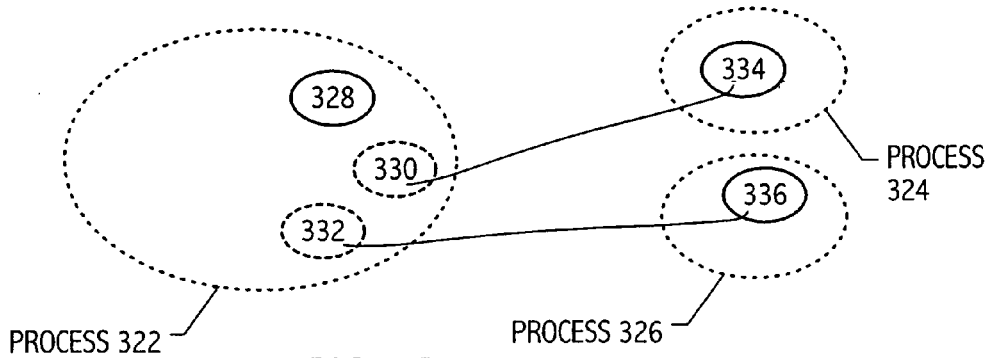
FIG. 3B illustrates multiple native code libraries placed in multiple separate processes in accordance with an embodiment of the present invention.

FIG. 3B illustrates multiple native code libraries placed in multiple separate processes. In this embodiment, platform-independent code running within process 322 requires the services supplied by native code libraries 328, 334, and 336. Native code library 328 can be a trusted library and has been retained within process 322. Native code libraries 334 and 336 have been placed in processes 324 and 326, respectively, and are accessed by proxies 330 and 332, respectively. Details of the interfaces to native code libraries 334 and 336 are as described above.

Figure 4:
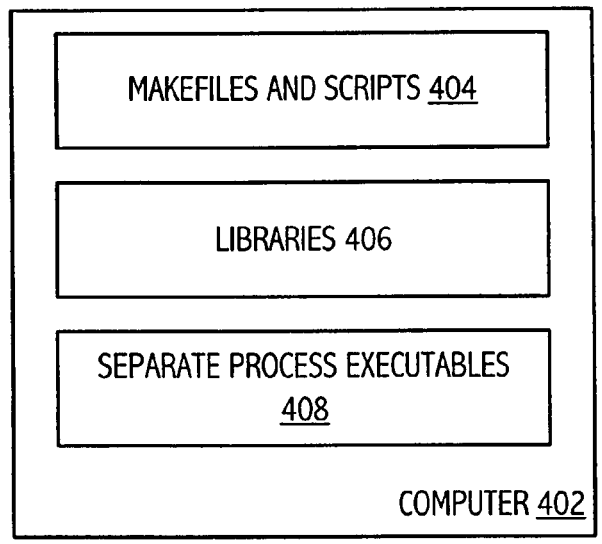
FIG. 4 illustrates computer 402 in accordance with an embodiment of the present invention.

FIG. 4 illustrates a computer 402 that can generally include any type of computer system, including but not limited to, a computer system based on a 25 microprocessor, a mainframe computer, a digital signal processor, a portable computing device, a personal organizer, a device controller, and a computational engine within an appliance. Computer 402 includes makefiles and scripts 404, libraries 406, and separate process executables 408.

Makefiles and scripts 404 include the necessary files to automatically create a proxy library from a native code library and to generate the necessary code so that a platform-independent runtime environment can use the proxy library to access the native code library transparently. Libraries 406 include native code libraries that have not been converted to proxy libraries and any previously generated proxy libraries. Libraries 406 include native libraries regardless of whether proxy libraries have or have not been generated out of them. Separate process executables 408 includes the native code libraries that have been replaced by proxy libraries and the necessary code to run these native code libraries in a separate process so that the proxy library sub-routines can access the native code library sub-routines.

Figure 5:
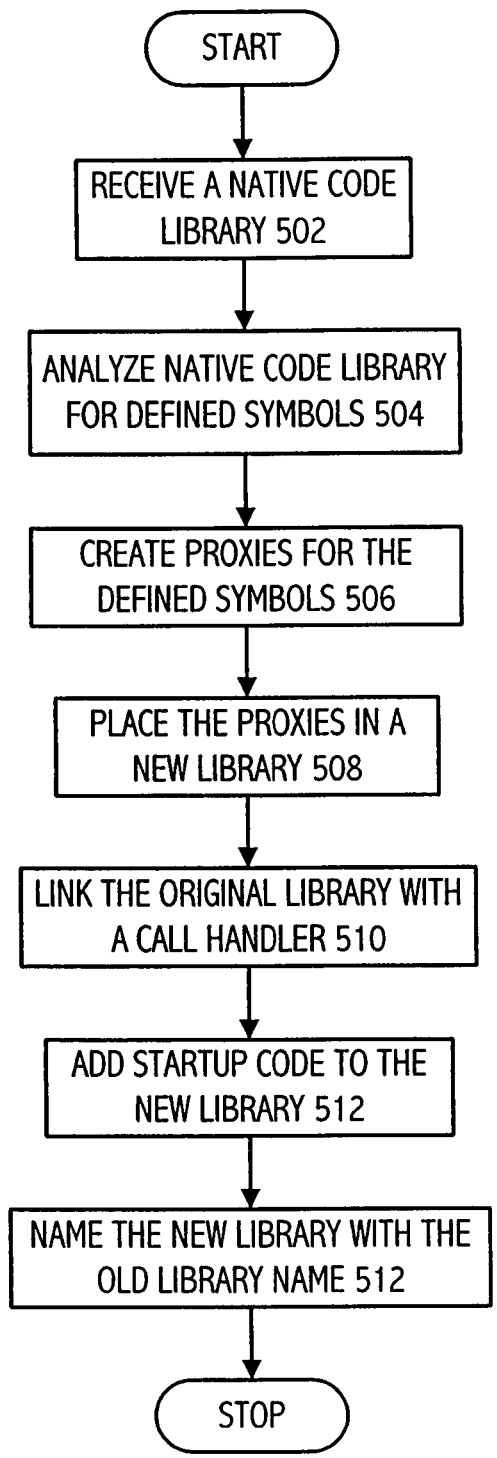
FIG. 5 is a flowchart illustrating the process of creating a proxy library to interface with a native code library in accordance with an embodiment of the present invention.

FIG. 5 is a flowchart illustrating the process of creating a proxy library to interface with a native code library. The system starts when makefiles and scripts 404 are executed on a native code library (step 502). Makefiles and scripts 404 analyze the native code library to determine the symbols and, on some systems, parameter lists included in the native code library (step 504). Next, makefiles and scripts 404 create proxy sub-routines for each symbol in the native code library (step 506).

In creating a proxy sub-routine, makefiles and scripts 404 creates a sub-routine with the same name as the native code sub-routine and includes the parameter lists for the native code sub-routine. The proxy sub-routine uses interprocess communication (IPC) to transfer the parameters and a unique identifier, which identifies the native code sub-routine to the code handler for tile native code library running in a separate process. Note that the proxy sub-routine can also be configured to change the address size of a data element. This is useful for interfacing a library that uses a different address width than the platform-independent code was designed to use. For example, a thirty-two bit program could use a new sixty-four bit native code library.

Makefiles and scripts 404 then places the proxy sub-routines in a new library (step 508). Next, makefiles and scripts 404 link the original native code library to the call handler (step 510). The call handler interfaces the native code library to the IPC calls generated in 506. Makefiles and scripts 404 also places startup code in the new library, which will start the native code library and call handler in a separate process and perform initialization required to allow IPC calls (step 512). Finally, makefiles and scripts 404 rename the new library using the name of the native code library (step 512). Also, a change to paths listing directories with dynamically loadable libraries may be performed by scripts.

Figure 6:
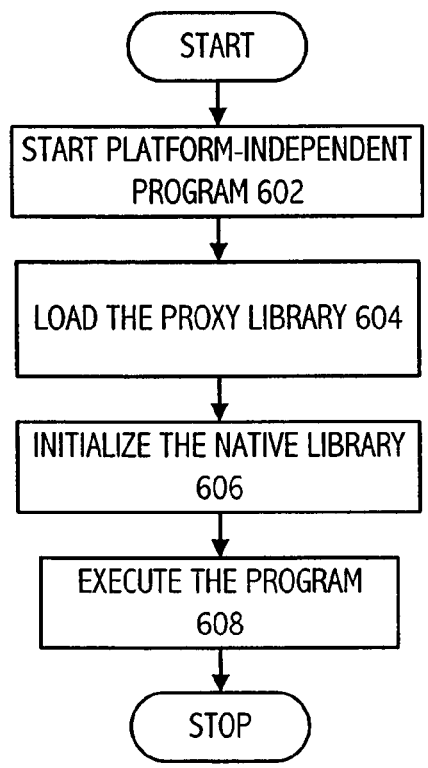
FIG. 6 is a flowchart illustrating the process of using a proxy library in accordance with an embodiment of the present invention.

FIG. 6 is a flowchart illustrating the process of using a proxy library. The system starts when a platform-independent runtime environment, such as platform-independent runtime environment 204, starts a platform-independent program (step 602). Platform-independent runtime environment 204 loads the proxy library instead of the native code library (step 604). Note that this is a transparent operation because the proxy library has the name of the native code library, which it replaced.

Initialization code within the proxy library starts the native code library and call handler in a separate process (step 606). After initialization, platform-independent runtime environment 204 executes the platform independent program using the proxy library to interface with the native code library as described above in conjunction with FIG. 6 (step 608).

For the purpose of this discussion, let us call the process in which the Java™ virtual machine (JVM™) executes "j-process"; the process executing native libraries is called "n-process".

The Java™ development kit (JDK) version 1.4 introduces the notion of "direct buffers." A direct buffer in Java™ is an object which represents a memory area which can reside outside of the ordinary garbage-collected heap. It is important to stress that while direct buffers (referred to from now on simply as "buffers") are ordinary Java™ objects, they do not have to be located in the memory areas they refer to. Each such memory area is a contiguous range of virtual memory addresses (referred to from now on simply as an address range).

Such memory areas can be created at a specified, fixed virtual address by the native code, or may be memory areas obtained by memory-mapped files the address ranges are then passed to the JVM via the Java™ native interface (JNI) routines introduced in the JDK™ 1.4, to create direct buffers. (See JNI specification in *The Java Native Interface* by Sheng Liang, Addison-Wesley, June 1999.) This ability to specify the addresses of memory areas to be used to create direct buffers prevents application of the native code isolation methods described with respect to FIGS. 2 through 6 above. For instance, an address range used to create a direct buffer can be valid and unused in n-process while at the same time it may be invalid or be already in use in j-process.

Since the native code isolation technique has been found to be very useful, what is needed is an approach which allows for separation of a mixed-language application into j-process and n-process while maintaining the transparency with respect to the JVM and to the native code in the presence of direct buffers.

Using the method described below, native code isolation can be performed in the presence of direct buffers, without the loss of transparency and independently of the virtual machine used.

Figure 7:
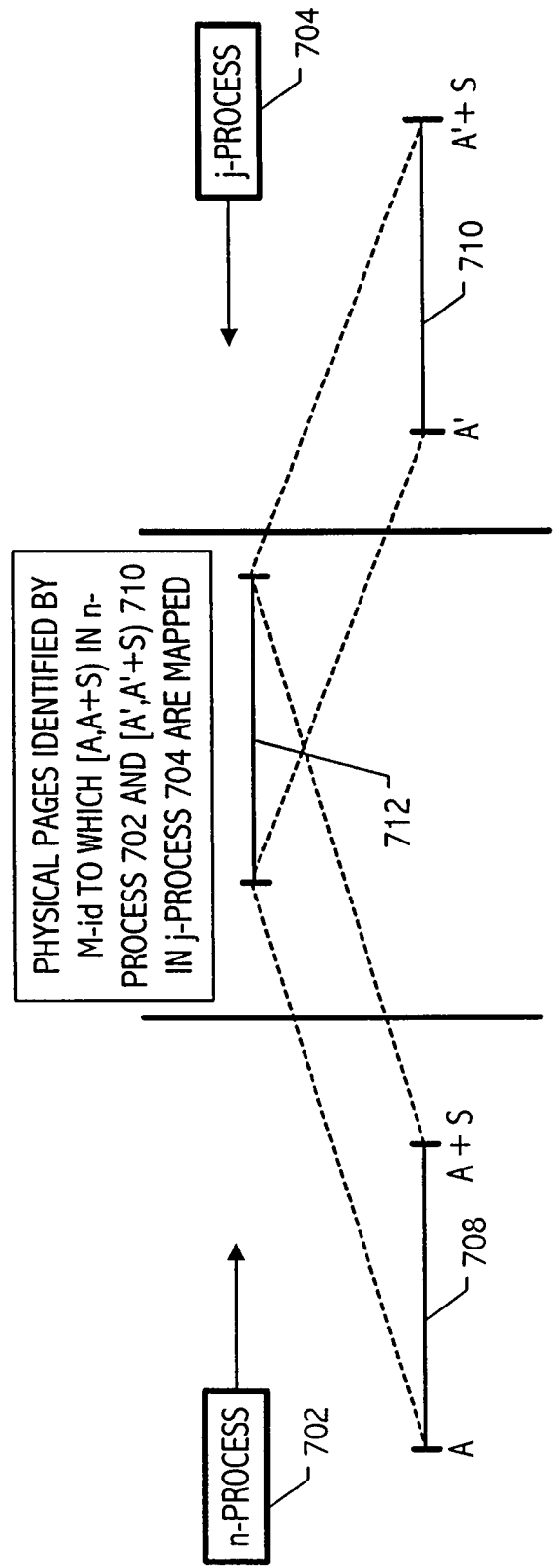
FIG. 7 is a general diagram that illustrates memory mapping between different processes.

Referring to FIG. 7, an example memory mapping of a direct buffer is shown. The direct buffer has a first address range 708, from address A to address A+S, allocated in n-process 702. S is the size of the memory area. In the j-process 704, the direct buffer has a second address range 710 from A' to A'+S. A' is the initial address of the buffer in j-process 704. FIG. 7 also illustrates a set of physical memory pages that are identified by a memory identification, M-id. The physical memory contains a physical memory address range 712 that maps to the direct buffer in both n-process 702 and in j-process 704.

Figure 8:
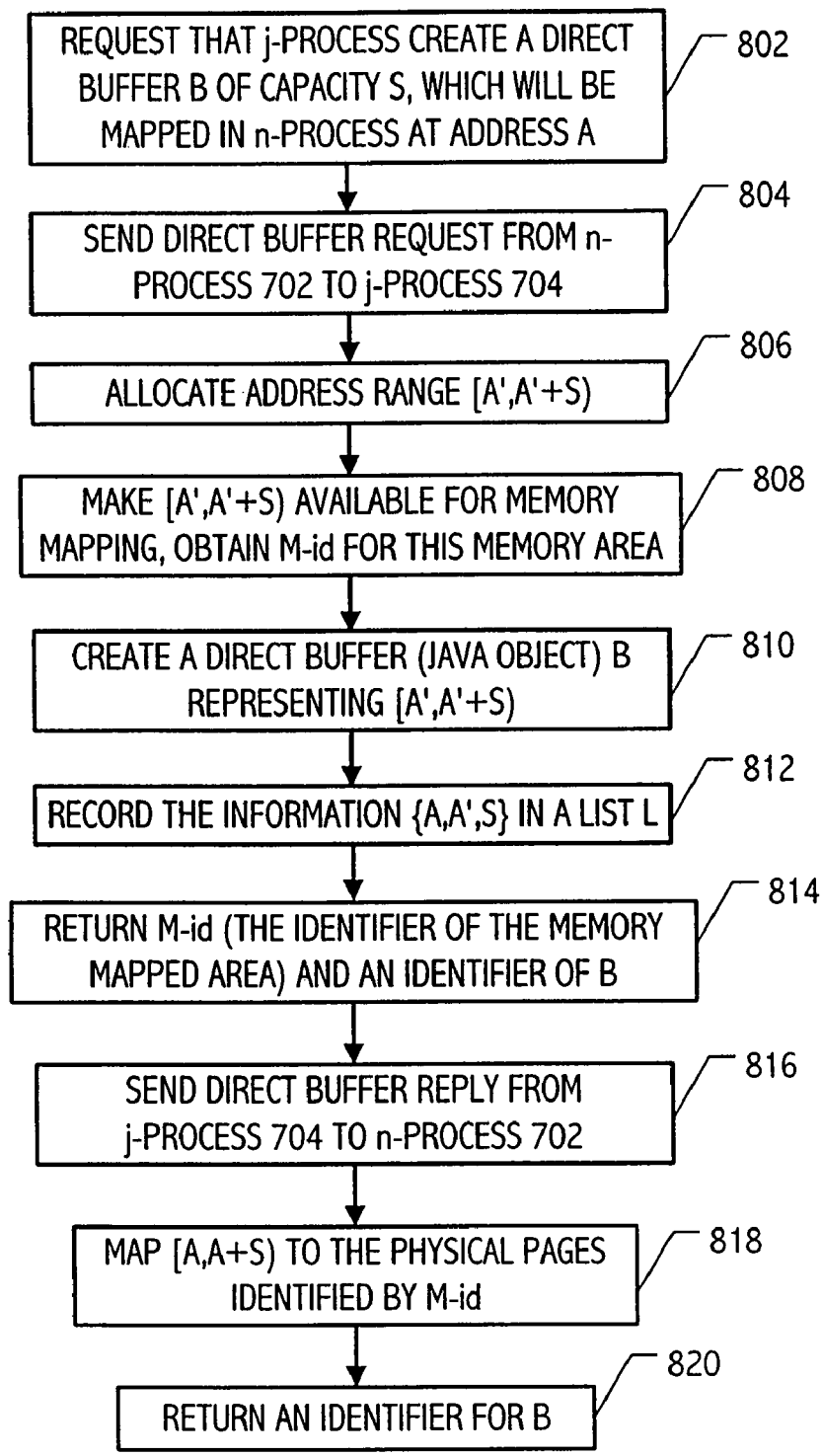
FIG. 8 is a flowchart that illustrates memory mapping using different processes without overlapping address ranges.

Referring to FIG. 8, a method of creating a direct buffer is shown. The creation is initiated in n-process 702. Let us assume that the memory area of the buffer has the address range 708 from the address A and extends for S bytes, to the address A+S (we use the denotation [A,A+S)). For simplicity, let us assume that the address range is page-aligned.

The first step is for n-process 702 to send to j-process 704 a request to create a direct buffer of capacity S bytes at 804. At j-process 704, the following actions are performed. First, an address range [A',A'+S), at 806, is reserved. The address range is made available for memory mapping by other processes, and an identifier M-id is obtained to identify this area, at 808. Once the address range (A',A'+S) 806 is mapped to a set of physical pages, other processes with access to the memory identifier M-id can access such physical pages with appropriate permissions. J-process 810 uses JNI to create a direct buffer (Java™ object) representing the memory area [A',A'+S). J-process 810 records the information {A,A',S} in a list L so that the address range 708 [A,A+S) in n-process 702 is memory mapped to the same physical pages as the address range 710 [A',A'+S) in j-process, at 812. J-process then returns M-id and B-id (an identifier of the created direct buffer B) to n-process 702, at step 814.

When n-process 702 receives B-id and M-id, it maps address range [A,A+S) to the physical page mapping identified by M-id, at 818, and returns B-id to the caller, at 820. At this point, a direct buffer has been created, such that writing and reading from its memory area by n-process 702 and j-process 704 has the same effect as if native code had resided in j-process 704.

Similarly, when a direct buffer is created in j-process 704 at an address A', extending for S bytes, n-process 702 should allocate a memory area at an address A, extending for S bytes, and memory map the buffer so that the same physical pages are referred to by accessing any address in the [A',A'+S) range in the j-process 704 as by accessing any address in the [A,A+S) range in the n-process 702.

The creation of the area available for multiple process memory mapping can also be performed by n-process 702. For instance, where the address range specified by n-process 702 as memory for the new direct buffer is actually obtained from a frame buffer or a memory mapped file, then n-process 702 creation of the buffer is preferred.

Each time a direct buffer is created in n-process 702 or its address range is accessed for the first time in n-process 702, the mapping {A,A',S} is recorded in list L in j-process 704. This list is needed to detect and handle nested buffers. For instance, let us assume that buffer B1 is nested within buffer B2 (that is, B1's address range is entirely contained within the address range of B2). The information contained in list L helps detect that the nesting has taken place. If nesting is detected, the memory area of B2 will be appropriately nested within the memory area of B1 within both n-process 702 and j-process 704. The list L can alternatively be maintained in n-process 702.

Figure 9:
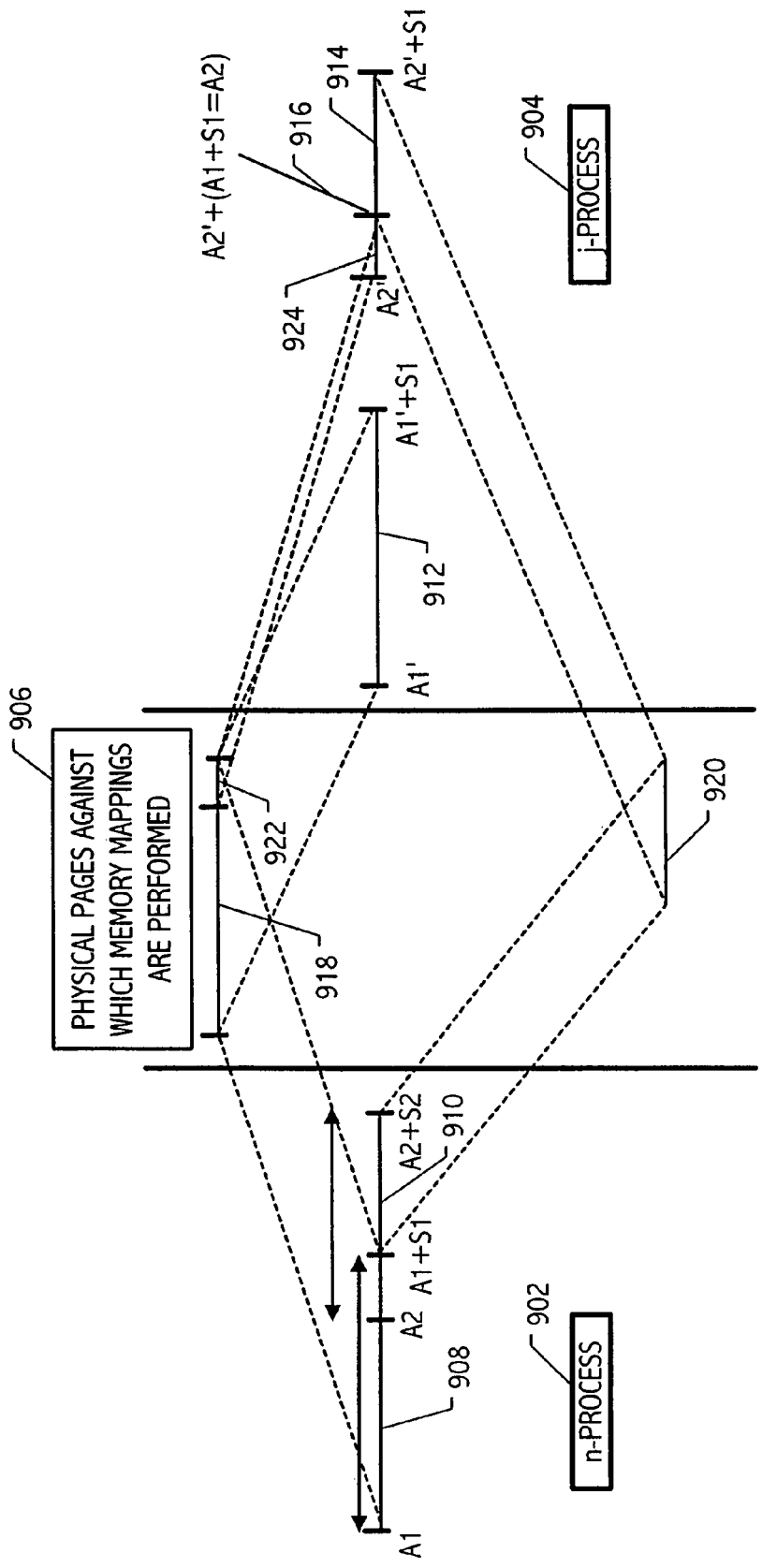
FIG. 9 is a general diagram that illustrates memory mapping with overlapping address ranges.

Referring to FIG. 9, particular implementations of direct buffers may allow for creating address range overlapping (that is, no nesting takes place, but their address ranges intersect).

To see a particular method of handling an overlapping situation, let us consider buffer B1 with address range 908 [A1,A1+S1) and buffer B2 with address range 910 [A2,A2+S2). Let us also assume that A1<A2<A1+S1<A2+S2; thus, the buffers overlap in [A2,A1+S1) (all address ranges are valid in n-process 902, and let us assume that the buffers were created by calling appropriate JNI methods in native code).

Let us further assume that B1 was created first, and its corresponding address range 912 in j-process 704 is [A1',A1'+S1). B2 should be created, so that its address range is overlapped with B1 for A1+S1−A2 bytes even though the addresses directly above A1'+S1 may be already used for other purposes. The following procedure addresses the problem: J-process 904 allocates a memory area [A2',A2'+S2). J-process 904 memory maps [A2',A2'+(A1+S1−A2)) to the same physical pages to which [A2,A1+S1) is memory mapped. An additional memory mapping is created which maps [A2'+(A1+S1−A2),A2'+S2) in j-process 904 and [A1+S1,A2+S2) in n-process 902 to the same set of physical pages 906 (see common memory areas 918 and 922). This ensures that even if contiguous ranges of addresses are not available adjacent to existing buffers, overlapping buffers still may be created and used transparently both in n-process 902 and in j-process 904.

Finally, the proposed technique may be extended to multiple n-processes, so that the same direct buffer can be used in more than just one n-process.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

The foregoing description of embodiments of the present invention have been presented for purposes of illustration only. They are not intended to be exhaustive or to limit the present invention to the forms disclosed. Many modifications and variations will be apparent to practitioners skilled in the art.

Accordingly, the above disclosed subject matter is to be considered illustrative and the appended claims are intended to cover all such modifications and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method to automate isolation of a native code and a platform-independent code in a computer program, the method comprising:
   executing the platform-independent code in a first process;
   executing the native code in a second process; and
   allocating a direct buffer from one selected from the group consisting of the first process and the second process, wherein the direct buffer is mapped to a first virtual address in the first process and mapped to a second virtual address in the second process, wherein operations of the native code are isolated from memory and other system resources belonging to the platform-independent code, and wherein the first process and the second process execute under an operating system as user processes, and wherein the allocating the direct buffer step comprises:
   requesting, by the platform-independent code using an operating system call, a shared memory region from the operating system using a direct buffer reference;
   obtaining, from the operating system, a shared memory region identifier and the first virtual address; and
   configuring the direct buffer using the shared memory region identifier and the first virtual address.

2. The method of claim 1, wherein the native code is configured to be linked with the platform-independent code for execution in a same process, and wherein the native code and the platform-independent code are executed in the first process and the second process respectively without modification to the native code.

3. The method of claim 1, wherein the allocating the direct buffer step further comprises:
   storing the first virtual address in a table according to the direct buffer reference and the shared memory region identifier;
   retrieving, by the native code, the shared memory region identifier from the table using the direct buffer reference;
   obtaining, from the operating system, the second virtual address according to the shared memory region identifier; and
   storing the second virtual address in the table.

4. The method of claim 3, wherein the native code accesses the direct buffer by using the second virtual address to access the shared memory region directly.

5. The method of claim 1, wherein configuring the direct buffer comprises allocating a direct buffer object in a garbage-collected heap managed by a platform independent virtual machine, wherein the platform independent code accesses the direct buffer based on the platform independent virtual machine accessing the shared memory region using the first virtual address.

6. The method of claim 1, wherein the direct buffer is allocated according to a request from the native code.

7. A non-transitory computer readable medium comprising instructions, when executed, cause the computer to perform a method to automate isolation of a native code and a platform-independent code in a computer program, the method comprising:
   executing the platform-independent code in a first process;
   executing the native code in a second process; and
   allocating a direct buffer from one selected from the group consisting of the first process and the second process,
   wherein the direct buffer is mapped to a first virtual address in the first process and mapped to a second virtual address in the second process,
   wherein operations of the native code are isolated from memory and other system resources belonging to the platform-independent code, and
   wherein the first process and the second process execute under an operating system as user processes, and
   wherein the allocating the direct buffer step comprises:
      requesting, by the platform-independent code using an operating system call, a shared memory region from the operating system using a direct buffer reference;
      obtaining, from the operating system, a shared memory region identifier and the first virtual address; and
      configuring the direct buffer using the shared memory region identifier and the first virtual address.

8. The non-transitory computer readable medium of claim 7, wherein the native code is configured to be linked with the platform-independent code for execution in a same process, and wherein the native code and the platform-independent code are executed in the first process and the second process respectively without modification to the native code.

9. The non-transitory computer readable medium of claim 7, wherein the allocating the direct buffer step further comprises:
   storing the first virtual address in a table according to the direct buffer reference and the shared memory region identifier;
   retrieving, by the native code, the shared memory region identifier from the table using the direct buffer reference;
   obtaining, from the operating system, the second virtual address according to the shared memory region identifier; and
   storing the second virtual address in the table.

10. The non-transitory computer readable medium of claim 9, wherein the native code accesses the direct buffer by using the second virtual address to access the shared memory region directly.

11. The non-transitory computer readable medium of claim 7, wherein configuring the direct buffer comprises allocating a direct buffer object in a garbage-collected heap managed by a platform independent virtual machine, wherein the platform independent code accesses the direct buffer based on the platform independent virtual machine accessing the shared memory region using the first virtual address.

12. The non-transitory computer readable medium of claim 7, wherein the direct buffer is allocated according to a request from the native code.

* * * * *